(12) United States Patent
Jandke et al.

(10) Patent No.: US 8,314,200 B2
(45) Date of Patent: Nov. 20, 2012

(54) PT-CATALYZED, ADDITION-CROSSLINKING SILICONE COMPOSITIONS SELF-ADHESIVE AT ROOM TEMPERATURE

(75) Inventors: Markus Jandke, Burgkirchen (DE); Werner Brennenstuhl, Burgkirchen (DE)

(73) Assignee: Wacker Chemie AG, Munich (DE)

(*) Notice: Subject to any disclaimer, the term of this patent is extended or adjusted under 35 U.S.C. 154(b) by 205 days.

(21) Appl. No.: 12/750,831

(22) Filed: Mar. 31, 2010

(65) Prior Publication Data

US 2010/0256300 A1    Oct. 7, 2010

(30) Foreign Application Priority Data

Apr. 6, 2009 (DE) ........................ 10 2009 002 231

(51) Int. Cl.
*C08G 77/08* (2006.01)
(52) U.S. Cl. ............................ 528/15; 528/31; 525/478
(58) Field of Classification Search ................... 528/15, 528/31; 525/478
See application file for complete search history.

(56) References Cited

U.S. PATENT DOCUMENTS

| | | | |
|---|---|---|---|
| 2,823,218 A | 2/1958 | Speier et al. | |
| 3,220,972 A | 11/1965 | Lamoreaux et al. | |
| 3,814,730 A | 6/1974 | Karstedt et al. | |
| 3,814,731 A | 6/1974 | Nitzsche et al. | |
| 4,177,341 A | 12/1979 | Kreis et al. | |
| 4,276,252 A | 6/1981 | Kreis et al. | |
| 4,303,572 A * | 12/1981 | Hatanaka et al. | 523/213 |
| 4,780,393 A | 10/1988 | Frommeld et al. | |
| 5,164,461 A | 11/1992 | Mitchell et al. | |
| 5,296,298 A * | 3/1994 | Fujimoto et al. | 428/447 |
| 5,380,788 A | 1/1995 | Stein et al. | |
| 5,416,144 A | 5/1995 | Stein et al. | |
| 5,466,532 A * | 11/1995 | Wengrovius et al. | 428/447 |
| 5,468,794 A | 11/1995 | Stein et al. | |
| 5,985,371 A * | 11/1999 | Fujioka et al. | 427/387 |
| 6,376,569 B1 * | 4/2002 | Oxman et al. | 522/29 |
| 6,908,682 B2 | 6/2005 | Mistele | |
| 7,323,250 B2 * | 1/2008 | Tabei et al. | 428/447 |
| 2008/0033071 A1 | 2/2008 | Irmer et al. | |

FOREIGN PATENT DOCUMENTS

| | | |
|---|---|---|
| DE | 102008000156 A1 | 7/2009 |
| EP | 0146307 B1 | 9/1988 |
| EP | 0356075 B1 | 9/1995 |
| EP | 1437392 A1 | 7/2004 |
| EP | 2 053 161 A1 | 4/2009 |
| WO | 2006010763 A1 | 2/2006 |
| WO | 2008/020635 A1 | 2/2008 |

OTHER PUBLICATIONS

Wacker Silicones, Better yet Silicones and Silanes in the Plastic Industry, Apr. 18, 2008 pp. 1-15.

\* cited by examiner

*Primary Examiner* — Margaret Moore
(74) *Attorney, Agent, or Firm* — Brooks Kushman P.C.

(57) ABSTRACT

Pt-catalyzed, addition-crosslinking silicone compositions which are self-adhesive at room temperature, develop adhesion rapidly on unpretreated substrates, and contain a functional alkoxy α-silane as an adhesion promoter.

11 Claims, No Drawings

PT-CATALYZED, ADDITION-CROSSLINKING SILICONE COMPOSITIONS SELF-ADHESIVE AT ROOM TEMPERATURE

CROSS-REFERENCE TO RELATED APPLICATIONS

This application claims priority to German Patent Application No. 10 2009 002 231.7 filed Apr. 6, 2009 which is herein incorporated by reference.

BACKGROUND OF THE INVENTION

1. Field of the Invention

The invention relates to Pt-catalyzed, addition-crosslinking silicone compositions which are self-adhesive at room temperature, to their preparation, and to the materials obtained by crosslinking. These silicone compositions of the invention develop adhesion rapidly on unpretreated substrates.

2. Background Art

The terms referred to below are understood as follows:

Adhesion between substrate and cured silicone is determined, for example, by means of shear tests and/or peel tests. A distinction is made between "cohesive and adhesive fracture behavior", which shows the appearance of the cracking of an adhesive bond between two substrates following exposure in the aforementioned tests. In the case of adhesive cracking, the silicone layer can be separated cleanly from the substrate, whereas, in the case of a cohesive appearance, the cracking occurs exclusively in the silicone layer or in the substrate.

The expressions "untreated surface" and "unpretreated substrates" refer both to substrate surfaces which are used entirely without pretreatment and to substrate surfaces which prior to the application of the silicone composition have been cleaned to remove dust, contaminants, and grease. Any such cleaning takes place, for example, only with evaporating solvents. There is no additional treatment or priming of the substrate surfaces with silicone resin, silicone layers or silane layers before the silicone composition is applied.

The epithet "rapidly curing" is applied to those Pt-catalyzed, addition-crosslinking silicone compositions which cure after mixing in a rate of not more than 4 hours, preferably within 2 hours, and more preferably within 30 minutes, at room temperature. In the case of UV-activatable systems, "rapidly" curing silicone compositions are understood to be those which, following mixing and activation by UV light, cure in a maximum time period of 30 minutes, preferably 20 minutes and more preferably not more than 10 minutes.

By "curing" here is meant not necessarily the complete attainment of the ultimate mechanical properties. This term, instead, describes the state of attainment of cohesive properties which at least allow the material to be exposed to mechanical pressure without suffering destruction.

By "room temperature" is meant the temperature on the substrate surface or of the silicone in the 22-28° C. range.

Pt-catalyzed, addition-crosslinking silicone compositions known from the prior art typically lack sufficient adhesion to unpretreated substrates when crosslinked at room temperature. To achieve adhesion it is common to use functional propyltrialkoxysilanes as adhesion promoters. This results in adhesion to a range of substrates, subject to the proviso that a thermal treatment at a temperature of at least 70° C., preferably at least 100° C., is carried out, as described in U.S. Pat. No. 5,164,461, for example. As shown by U.S. Pat. No. 5,416,144, it is possible through thermal treatment to develop adhesion even within a short time. In the case of crosslinking at room temperature, in contrast, cohesive adhesion is achieved only after days, as described in U.S. Pat. No. 5,468,794 and U.S. Pat. No. 5,380,788.

In many applications of Pt-catalyzed silicone compositions, thermal crosslinking or aftertreatment is not possible, since the oven operations required for it entail additional operating costs and investment costs, or because the components and substrates used do not allow higher temperatures. Particularly in the case of Pt-catalyzed silicone compositions which offer rapid curing at room temperature (<30 minutes) without subsequent thermal treatment, such as two-component systems or UV-activable systems, therefore, what has been lacking to date is the possibility for rapid development of adhesion.

WO 2006/010763 A1 describes UV-activable, addition-crosslinking silicone compositions very generally for producing coatings. However, there is no information at all as to whether and, if so, how adhesion is obtained in the described compositions, or the substrates on which adhesion is achieved.

For the general area of UV-crosslinking systems, EP 0 356 075 B1 describes the use of a silane having twin trialkoxysilane functionalization in conjunction with a catalyst for a condensation reaction in a polymerization reaction entailing curing via a UV photoinitiator. Cohesive cracking is found after just a few hours. Disadvantages of the systems include the need to use two different crosslinking systems, and the presence of decomposition products following the irradiation of the photoinitiator. Particularly in applications in the area of electronic components, the decomposition products may result in problems.

U.S. Pat. No. 6,908,682 B2 describes Pt-catalyzed, UV-activatable, addition-crosslinking silicone elastomers comprising >80% of a silicone oil in the area of encapsulants, which achieve moderate pull-off forces in silicone gel compositions. The bonds in question entail weak physical and hence reversible adhesion of a gel, as shown by the figures of up to 4.0 N/100 mm on polybutyl terephthalate and polycarbonate. There is no mention, however, of how rapidly the adhesion is developed.

SUMMARY

It was therefore an object to provide Pt-catalyzed silicone compositions which crosslink rapidly at room temperature and which, in the context of the production of adhesive silicone bonds to the substrate, allow a short cycle time in industrial operations. Surprisingly it has been possible to achieve this and other objects by means of addition-crosslinking silicone compositions comprising addition curable components also containing dialkoxy- or tiralkoxy-functional α-silanes also containing a vinyl, glycidoxy, or methacryloxy functionality.

DETAILED DESCRIPTION OF THE PREFERRED EMBODIMENTS

The subject invention compositions thus contain:
(i) at least one compound selected from the group containing the compounds (A), (C), and (K),
where
(A) is an organosilicon compound comprising at least two radicals having aliphatic carbon-carbon multiple bonds,
(C) is an organosilicon compound comprising at least two Si-bonded hydrogen atoms, and (K) is an organosilicon compound comprising SiC-bonded radicals having aliphatic carbon-carbon multiple bonds and Si-bonded hydrogen atoms,
with the proviso that the composition comprises at least one compound having aliphatic carbon-carbon multiple bonds and at least one compound having Si-bonded hydrogen atoms, and
(ii) at least one platinum catalyst (E) in catalytic amounts, and
(iii) at least one α-silane (H) of the general formula (I)

$$Y\text{—}CH_2\text{—}SiR'_n(OR)_{3-n} \tag{I}$$

where
Y is glycidyloxy-, methacryloyloxy-, or vinyl-,
R is an alkyl, or substituted alkyl, acetoxy, propionyloxy having 1-6 carbon atoms,
R' is a methyl group, and
n is a 0 or 1.

The silicone compositions of the invention have the advantage of a rapid development of adhesion in the production of adhesive silicone bonds to various substrates, and so permit short cycle times in industrial production operations. There is a rapid development of adhesion within not more than 2 hours, preferably not more than 1 hour, after mixing or after mixing and UV activation.

The adhesion that develops within a short time at room temperature in the case of the silicone compositions of the invention is achieved, surprisingly, as a result of the functional α-silanes (H) which are present in accordance with the invention and which have the effect of an adhesion promoter. Examples of substrates on which good adhesion outcomes have been achieved include polybutylene terephthalate, polyamide and polycarbonate.

The compound (A) preferably comprises vinyl-functionalized polydiorganosiloxanes having a vinyl content of 0.002% to 2% by weight (0.2-3 mol %) and a viscosity of 100-1,000,000 mPas. Either a single compound (A) or a mixture of at least two different vinyl-functionalized polydiorganosiloxanes may be used.

Particularly suitable for the compositions of the invention are those polyorganosiloxanes (A) which comprise at least one, or two or more, vinyl group(s) per molecule. Especially advantageous for the implementation of the present invention are those vinyl-substituted polyorganopolysiloxanes which comprise two terminal vinyl groups per molecule. Use may also be made of those polydiorganopolysiloxanes in which the silicon atom is substituted by methyl groups and/or phenyl groups. Particular preference is given to polydimethylpolysiloxanes.

Compound (C) preferably comprises Si—H-containing polyorganosiloxanes which have an H content of 0.001-2% by weight, a viscosity of 1-10,000 mPas, and at least 2 Si-bonded H atoms per molecule. Compounds of this kind are common knowledge from the prior art. Where Si—H-containing polyorganosiloxanes having 2 terminal Si—H moieties are used, a polymer chain construction is produced that is particularly advantageous for the adhesive properties of the cured formulation. The molar ratio of SiH/Si-vinyl (=Vi) moieties from (C) and (A) is typically 0.5:1 to 10:1. The crosslinking rate, hardness, and particularly the adhesion properties may be controlled, moreover, by an appropriate amount of Si—H-functional polyorganosiloxanes which contain more than 3 Si—H moieties per molecule. Molar Si—H/Vi ratios from the formulation as a whole are preferably in the 0.5:1-10:1 range.

Either an individual compound (C) or a mixture of at least two different compounds may be used. One preferred embodiment makes use, for example, of 1-50 parts of (C) having at least 2H atoms per molecule, together with 0-30 parts of a compound (C) having at least 3H atoms per molecule, based on 100 parts of A.

Compounds (K) are known to the skilled person from the prior art. If compounds (K) are used, the compounds in question are preferably those comprising units of the general formulae $$R_k^5 SiO_{\frac{4-k}{2}} \tag{V}$$

$$R_m^5 R^4 SiO_{\frac{3-m}{2}} \tag{VI}$$

and $$R_d^5 HSiO_{\frac{3-d}{2}}, \tag{VII}$$

where
$R^5$ is a monovalent, optionally substituted hydrocarbon radical which is free from aliphatic carbon-carbon multiple bonds and has 1 to 18 carbon atoms per radical, and
$R^4$ is a monovalent hydrocarbon radical comprising terminal, aliphatic carbon-carbon multiple bond, with 2 to 8 carbon atoms per radical,
k is 0, 1, 2 or 3,
m is 0, 1 or 2, and
d is 0, 1 or 2,
with the proviso that there are on average at least 2 radicals $R^4$ and on average at least 2 Si-bonded hydrogen atoms. Either an individual compound (K) or a mixture of at least two compounds (K) may be used.

In the addition-crosslinking compositions of the invention the following combinations are possible: (A)+(C) or (A)+(K) or (C)+(K) or (A)+(C)+(K) or (K) alone.

Examples of suitable compounds (E) are disclosed in patent specifications including the following: U.S. Pat. No. 3,814,730 (Karstedt), U.S. Pat. No. 2,823,218, U.S. Pat. No. 3,220,972, U.S. Pat. No. 3,814,731, U.S. Pat. No. 4,276,252, U.S. Pat. No. 4,177,341, and also DE 10 2008 000 156, expressly incorporated by reference. The Pt catalyst (E) ought preferably to be used in a catalytically sufficient amount, which permits the hydrosilylation reaction at sufficient rate at room temperature. Typically, 0.5 to 100 ppm of the catalyst are used, based on the amount of the Pt metal relative to the hydrosilylation mixture as a whole. Where necessary or useful, the use of inhibitors, as described under (G), is also sensible.

As Pt catalyst (E) it is preferred to use UV-activable Pt catalysts which in the absence of light are inert and which, following irradiation with light having a wavelength of 250 500 nm, can be converted into Pt catalysts which are active at room temperature. Catalysts of this kind are known in the prior art. Examples of suitable UV-activable Pt catalysts are (re-cyclopentadienyl)trialiphatic Pt compounds or derivatives thereof as disclosed, for example, in EP 0 146 307 B1. Particularly suitable are cyclopentadienyltrimethylplatinum, methylcyclopentadienyltrimethylplatinum, and derivatives thereof comprising substituted cyclopentadienyl moieties, which may optionally be attached directly or via further, additional moieties to polymers. Other suitable photoactive hydrosilylation catalysts (E) are bis(acetylacetonato)platinum compounds and also the corresponding derivatives thereof. Either an individual catalyst (E) or a mixture of at least two may be used.

The silicone compositions of the invention may further comprise 0 to 200 parts of a mechanically reinforcing filler (F). Either a single compound (F) or a mixture of at least two may be used. Mechanically reinforcing fillers (F) for the purposes of the present invention are, for example, any forms of actively reinforcing fillers such as, for example, precipitated or fumed silica (silicon dioxide), and mixtures thereof. These actively reinforcing fillers have a specific surface area of at least 50 m$^2$/g, preferably 100-400 m$^2$/g, by the BET method. The stated silica fillers may have a hydrophilic character or may have been rendered hydrophobic by known methods. When hydrophilic fillers are mixed in, the addition of a hydrophobicizing agent is a necessity.

Further additives in the sense of the present invention are indicators which undergo changes in their properties such as color, absorption and/or fluorescence to indicate the end of the crosslinking reaction or the irradiation of the UV light dose required for crosslinking Indicators of this kind are described, for example, by EP 1 437 392 A1 or U.S. Pat. No. 4,780,393.

The silicone composition of the invention may optionally comprise further adjuvants as constituents (G). Either a single compound (G) or a mixture of two or more may be used. They are used preferably at a fraction of 0 up to 100 parts. These adjuvants (G) are, for example, inhibitors, stabilizers, inert fillers, resinlike polyorganosiloxanes other than the siloxanes (A), (C), and (K), silanes other than (H), nonreinforcing fillers, adhesion promoters, fungicides, fragrances, rheological additives, corrosion inhibitors, antioxidants, light stabilizers, flame retardants, agents for influencing the electrical properties, dispersing assistants, solvents, adhesion promoters, pigments, dyes, plasticizers, organic polymers, heat stabilizers, etc. They include adjuvants such as activated carbon, finely ground quartz, diatomaceous earth, clays, chalk, lithopones, carbon blacks, graphite, metal oxides, metal carbonates, metal sulfates, metal salts of carboxylic acids, metal dusts, fibers, such as, for example, glass fibers, plastics fibers, plastics powders, metal dusts, dyes, pigments, etc.

Where resinlike polyorganosiloxanes (G) are used they are present preferably at 0-40 parts, preference being given to vinyl-functionalized resins comprising $R^3{}_3SiO_{1/2}$ (M) and $SiO_{4/2}$ (O) units and also, optionally, $R^3{}_2SiO_{2/2}$ and $R^3SiO_{3/2}$ (T) structural units, and where $R^3$ independently at each occurrence is a vinyl group or a methyl group. Vinyl-functionalized MQ resins of this kind preferably have a vinyl content of 0.05-4% by weight.

Examples of suitable inhibitors (G) are 1-ethynyl-1-cyclohexanol, 2-methyl-3-butyn-2-ol, 3,5-dimethyl-1-hexyn-3-ol, 3-methyl-1-dodecyn-3-ol, polymethylvinylcyclosiloxanes such as 1,3,5,7-tetravinyltetramethyltetracyclosiloxane, divinyltetramethyldisiloxane, tetravinyldimethyldisiloxane, trialkyl cyanurates, alkyl maleates, organic sulfoxides, organic amines, diamines, phosphanes and phosphites, nitriles, diaziridines, and oximes, acetylene compounds, phosphites, maleates, amines or alcohols, by means of which a targeted adjustment can be made to the processing life, onset temperature, and crosslinking rate of the compositions of the invention.

Inert or functional fillers (G) for the purposes of the present invention are typically heat-conducting fillers, such as $Al_2O_3$, AlN, BN, SiC, and ZnO, and also other fillers, such as $TiO_2$, $SiO_2$, $Fe_2O_3$, $Fe_3O_4$, finely ground quartz, chalks, talcs, diatomaceous earths, zeolites, electrically conductive fillers, Ag, carbon blacks, graphite, metal oxides, functional nanoparticles, hollow beads, etc. These fillers may have been rendered hydrophobic, by treatment with organosilanes and/or organosiloxanes, with stearic acid or with other agents, for example. For UV-curing compositions, particularly suitable functional fillers among those mentioned are the ones which allow transmission of light in the wavelength range of 250-500 nm. The maximum level of filling is a product of the layer thickness to be applied and the maximum possible UV light intensity.

A series of applications require the adhesion to be stable under thermal and moisture stress. This specific quality can be achieved, for example, through the additional use of adhesion promoters (G) which are known in the prior art. Suitable adhesion promoters (G) are, for example, those based on trialkoxy-functional silanes such as, for instance, methacryloyloxypropyltrimethoxysilane, methacryloyloxypropyltriethoxysilane, glycidyloxypropyltrimethoxysilane, glycidyloxypropyltriethoxysilane, tris(3-propyltrimethoxysilyl) isocyanurate, trimethoxysilylpropylsuccinic anhydride, and allyltrimethoxysilane.

The amount of the compound (H) used is 0.1-6% by weight, preferably 0.6-3% by weight, based on the formulation A)-G). (H) is an α-silane having the general formula (I)

$$Y-CH_2-SiR'_n(OR)_{3-n}, \quad (I)$$

where
Y denotes the moieties glycidyloxy, methacryloyloxy, and vinyl,
R is alkyl, or substituted alkyl, acetoxy, propionyloxy having 1 6 carbon atoms,
R' is a methyl group, and
n is a 0 or 1.

The proportions of the individual compounds (A)-(G) are known to the skilled person from the prior art. One possible embodiment of the silicone composition of the invention comprises 100 parts of (A), 1-30 parts of (C), 0.5 to 100 ppm of (E), and 0.1 12 parts of (H).

The addition-curing silicone elastomer compositions of the invention may be employed, for example, in the area of encapsulants, adhesives, and sealants.

The room-temperature-crosslinking compositions of the present invention can be used as an adhesive or adhesive sealing material on a multiplicity of substrates, as long as said substrates are in contact with the silicone compositions before and during the curing operation.

The rate of development of adhesion here is dependent substantially on diffusion processes of the adhesion promoter molecule to the substrate surface and on the reactivity of the adhesion promoter employed on the surface for functional groups that are present thereon, such as hydroxyl or carboxyl (and also the surface density thereof). Optimizing the attachment of the adhesion promoter to the substrate may be achieved in one way by increasing the residence time of the adhesion promoter before/or during the crosslinking reaction. For reasons of economics, however, the desire is for rapid processing and crosslinking and hence also for a rapid development of adhesion. By raising the temperature it is possible likewise to improve the diffusion rate, solubility, and reactivity as well of the adhesion promoter in the system. In many industrial applications of adhesive compositions comprising addition-crosslinking silicone elastomers, however, it is desirable not to employ increased temperatures or oven operations. Critical for a rapid development of adhesion, therefore, is an increased reactivity of the adhesion promoters employed at room temperature. The α-silanes (H) used in accordance with the invention fulfill this requirement through their action as adhesion promoters. Preference more particularly is given to the use of methacryloyloxymethyltrimethoxy- or -triethoxysilanes. The adhesion is achieved within 2 hours, in preferred embodiments within 1 hour, after mixing or after mixing and UV irradiation at room temperature, and at this point in time is already strong enough that cohesive failure is observed under load.

Substrates for the purposes of the present invention are those which find application in the areas of coating, encapsulating, bonding, and sealing composite materials, metal components, plastic or ceramic components, housings or components for electrical, electronic, and optical applications, etc. Essential to the development of adhesion is the presence of a corresponding amount of polar groups on the surface of the substrate. In principle, therefore, the compositions of the invention can also be employed on those substrate surfaces which are activated by an additional step of pretreatment using operations familiar to experts, such as priming, plasma treatment, Pyrosil treatment (silane pyrolysis), $CO_2$ irradiation, corona treatment, ozone treatment and/or laser pretreatment. In certain applications, additional pretreatment of the substrate is undesirable. In these cases in particular it is possible to use the compositions of the invention advantageously for the purpose of attaining a rapid development of adhesion. Cleaning and degreasing of the substrate surfaces are not defined as pretreatment steps for the purposes of the present invention; instead, the surface used in this way is considered in principle to be "untreated".

Examples of typical substrates to which the compositions of the invention are applied include polybutylene terephthalate (PBT), polyethylene terephthalate (PET), polyethylene naphthalate (PEN), polyamide (PA), polyphenylene sulfide (PPS), polycarbonate (PC), ABS polymer, polyimide, ceramic surfaces, aluminum, steel, and so on.

In the most simple scenario, the room-temperature-crosslinking silicone compositions of the invention are obtained by uniform mixing of all the components. In the case of the compositions of the invention which allow rapid crosslinking at room temperature without UV activation, preference is given to 2-component compositions. In view of the fact that, in these systems, the catalyst component (E) can be separated from the Si—H-functional compounds (B) and/or (K), it is possible to ensure sufficient stability in storage at the same time as high reactivity on the part of the system, since rapid curing takes place only after the components are mixed. Mixing takes place prior to application to the substrate, using known 2-component metering units, for example, having static or dynamic mixing systems.

UV-activable compositions of the invention can be used both as one-component and as two-component compositions. In this case the catalyst is activated only by irradiation with UV light.

In the case of the UV-activable compositions, the typical crosslinking time is dependent on parameters such as the specific composition, the UV-transparency of the composition, the layer thickness of the silicone applied, the reflectivity and possible inhibiting effect of the substrate, the wavelength of the irradiated light, the absorption range of the catalytic system, the intensity of UV exposure, and the dose. For adhesive bonds in the area of electronic assemblies, adhesive structures/geometries in bead form with a layer thickness of 0.03-1.5 cm, preferably 0.03 cm-0.5 cm, are typically applied.

For the UV-activable compositions, rapid crosslinking means cured times of less than 20 min, preferably less than 10 min. The compositions of the invention are cured using light with a wavelength of 250 nm-500 nm, preferably 250 nm-350 nm. The irradiated UV intensity or dose in this case is between 30 mW/cm$^2$ to 2000 mW/cm$^2$, or 150 mJ/cm$^2$ to 10,000 mJ/cm$^2$. UV doses of 300 mJ/cm$^2$ and 5000 mJ/cm$^2$ are typically used. Depending on the formulation concerned, a dose below 200 mJ/cm$^2$ may lead to slow or incomplete curing. Too high a dose leads generally to excessively rapid crosslinking and hence to an excessively short open time to allow the adherent substrates to be joined, and possibly an inadequate reaction time on the part of the adhesion promoter for the development of adhesion. The skilled person is aware that the optimum UV dose to be selected may be tailored, depending on the formulation, to the correspondingly desired crosslinking time and adhesion, within the stated boundaries.

EXAMPLES

In the examples described below, all parts and percentages, unless otherwise indicated, are by weight. Moreover, all viscosity figures relate to a temperature of 25° C. Unless indicated otherwise, the examples below are carried out under the pressure of the surrounding atmosphere, in other words about 1020 hPa, and at room temperature, in other words about 20° C., or at a temperature which comes about when the reactants are combined at room temperature without additional heating or cooling.

Inventive Example 1a)

Table 1 shows an inventive composition 1a)

TABLE 1

| | Constituents | % by weight | mol H/g | mol vinyl/g | Contribution |
|---|---|---|---|---|---|
| (A) | Vinyl-terminated polydimethylsiloxane (average chain length about 200, 700-1300 mPas) | 63.7 | | 0.0125 | 0.80 |
| (C) | Si—H-terminated polydimethylsiloxane, 2 Si—H per molecule, 1-50 mPas, chain length 10-20 | 4.6 | 0.20 | | 0.92 |
| (C) | Organohydropolysiloxane, at least 3 Si—H per molecule, 20-50 mPas, chain length 20-30 | 2.4 | 0.77 | | 1.85 |
| (E) | Pt-catalyst (platinum-divinyltetramethyl-disiloxane complex) | 15 ppm Pt | | | — |
| (F) | Hydrophobicized silica (BET 300 m$^2$/g) | 27.2 | | | — |
| (G) | Divinyltetramethyldisiloxane | 0.04 | | 0.01075 | 0.004 |
| (H) | α-Methacryloyloxymethyltri-methoxysilane | 2 | | | — |
| | Total | | SiH/SiVi | | 3.4 |

Noninventive Example 1b)

Table 2 shows a noninventive composition 1b)

TABLE 2

| | Constituents | % by weight | mol H/g | mol vinyl/g | Contribution |
|---|---|---|---|---|---|
| (A) | Vinyl-terminated polydimethylsiloxane (average chain length about 200, 700-1300 mPas) | 63.7 | | 0.0125 | 0.80 |
| (C) | Si—H-terminated polydimethylsiloxane, 2 Si—H per molecule, 1-50 mPas, chain length 10-20 | 4.6 | 0.20 | | 0.92 |

TABLE 2-continued

| | Constituents | % by weight | mol H/g | mol vinyl/g | Contribution |
|---|---|---|---|---|---|
| (C) | Organohydropolysiloxane, at least 3 Si—H per molecule, 20-50 mPas, chain length 20-30 | 2.4 | 0.77 | | 1.85 |
| (E) | UV-active Pt-catalyst η5-methylcyclopentadienyl-trimethylplatinum | 30 ppm Pt | | | — |
| (F) | Hydrophobicized silica (BET 300 m²/g) | 27.2 | | | — |
| (G) | Divinyltetramethyldisiloxane | 0.04 | | 0.01075 | 0.004 |
| (H) | Glycidyloxypropyltrimethoxysilane | 2 | | | — |
| | Total | | | SiH/SiVi | 3.4 |

Inventive Example 1c)

Table 3 shows an inventive composition 1c)

TABLE 3

| | Constituents | % by weight | mol H/g | mol vinyl/g | Contribution |
|---|---|---|---|---|---|
| (A) | Vinyl-terminated polydimethylsiloxane (average chain length about 200, 700-1300 mPas) | 63.7 | | 0.0125 | 0.80 |
| (C) | Si—H-terminated polydimethylsiloxane, 2 Si—H per molecule, 1-50 mPas, chain length 10-20 | 4.6 | 0.20 | | 0.92 |
| (C) | Organohydropolysiloxane, at least 3 Si—H per molecule, 20-50 mPas, chain length 20-30 | 2.4 | 0.77 | | 1.85 |
| (E) | UV-active Pt-catalyst η5-methylcyclopentadienyl-trimethylplatinum | 30 ppm Pt | | | — |
| (F) | Hydrophobicized silica (BET 300 m²/g) | 27.2 | | | — |
| (G) | Divinyltetramethyldisiloxane | 0.04 | | 0.01075 | 0.004 |
| (H) | α-Methacryloyloxymethyltrimethoxysilane | 2 | | | — |
| | Total | | | SiH/SiVi | 3.4 |

Noninventive Example 1d)

Table 4 shows a noninventive composition 1d)

TABLE 4

| | Constituents | % by weight | mol H/g | mol vinyl/g | Contribution |
|---|---|---|---|---|---|
| (A) | Vinyl-terminated polydimethylsiloxane (average chain length about 200, 700-1300 mPas) | 65.3 | | 0.0125 | 0.82 |
| (C) | Si—H-terminated polydimethylsiloxane, 2 Si—H per molecule, 1-50 mPas, chain length 10-20 | — | | | — |
| (C) | Organohydropolysiloxane, at least 3 Si—H per molecule, 20-50 mPas, chain length 20-30 | 2.4 | 0.77 | | 1.85 |
| | 20-70 mPas, chain length 45-60 | 1.3 | 1.15 | | 1.50 |
| (E) | Pt-catalyst (platinum-divinyltetramethyl-disiloxane complex) | 10 ppm Pt | | | — |
| (F) | Hydrophobicized silica (BET 300 m²/g) | 28.9 | | | — |
| (G) | Divinyltetramethyldisiloxane | 0.04 | | 0.01075 | 0.004 |
| (H) | Glycidyloxypropyltrimethoxysilane | 2 | | | — |
| | Total | | | SiH/SiVi | 4.1 |

Inventive Example 2a)

Table 5 shows an inventive composition 2a)

TABLE 5

| | Constituents | % by weight | mol H/g | mol vinyl/g | Contribution |
|---|---|---|---|---|---|
| (A) | Vinyl-terminated polydimethylsiloxane 700-1300 mPas, chain length 200 | 52.5 | | 0.0042 | 0.23 |
| | 100-200 mPas, chain length 100-120 | 11.3 | | 0.027 | 0.31 |
| (C) | Si—H-terminated polydimethylsiloxane, 2 Si—H per molecule, 1-50 mPas, chain length 10-20 | 9.0 | 0.18 | | 1.62 |
| (C) | Organohydropolysiloxane, at least 3 Si—H per molecule, 20-50 mPas, chain length 20-30 | 0.7 | 0.77 | | 0.54 |
| | 20-70 mPas, chain length 45-60 | 1.0 | 1.15 | | 1.15 |
| (E) | UV-active Pt-catalyst η5-methylcryclopentadienyl-trimethylplatinum | 30 ppm Pt | | | — |
| (F) | Hydrophobicized silica (BET 300 m²/g) | 23.4 | | | — |
| (G) | Divinyltetramethyldisiloxane | 0.04 | | 0.01075 | 0.004 |
| (H) | α-Methacryloyloxymethyltriethoxysilane | 2.0 | | | — |
| | Total | | | SiH/SiVi | 6.1 |

Noninventive Example 2b)

Table 6 shows a noninventive composition 2b)

TABLE 6

| | Constituents | % by weight | mol H/g | mol vinyl/g | Contribution |
|---|---|---|---|---|---|
| (A) | Vinyl-terminated polydimethylsiloxane 700-1300 mPas, chain length 200 | 52.5 | | 0.0042 | 0.23 |
| | 100-200 mPas, chain length 100-120 | 11.3 | | 0.027 | 0.31 |
| (C) | Si—H-terminated polydimethylsiloxane, 2 Si—H per molecule, 1-50 mPas, chain length 10-20 | — | — | | — |
| (C) | Organohydropolysiloxane, at least 3 Si—H per molecule, | | | | |

TABLE 6-continued

| Constituents | % by weight | mol H/g | mol vinyl/g | Contribution |
|---|---|---|---|---|
| 20-50 mPas, chain length 20-30 | 2.8 | 0.77 | | 2.16 |
| 20-70 mPas, chain length 45-60 | 3.0 | 1.15 | | 3.45 |
| (E) UV-active Pt-catalyst $\eta^5$-methylcryclopentadienyl-trimethylplatinum | 30 ppm Pt | | | — |
| (F) Hydrophobicized HDK (BET 300 m$^2$/g) | 24.4 | | | — |
| (G) Divinyltetramethyldisiloxane | 0.04 | | 0.01075 | 0.004 |
| (H) α-Methacryloyloxymethyltri-ethoxysilane | 2.0 | | | — |
| Total | | | SiH/SiVi | 10.4 |

Inventive Example 2c)

Table 7 shows an inventive composition 2c)

TABLE 7

| Constituents | % by weight | mol H/g | mol vinyl/g | Contribution |
|---|---|---|---|---|
| (A) Vinyl-terminated polydimethylsiloxane | | | | |
| 700-1300 mPas, chain length 200 | 52.5 | | 0.0042 | 0.23 |
| 100-200 mPas, chain length 100-120 | 11.3 | | 0.027 | 0.31 |
| (C) Si—H-terminated polydimethylsiloxane, 2 Si—H per molecule, 1-50 mPas, chain length 10-20 | 9.0 | 0.18 | | 1.62 |
| (C) Organohydropolysiloxane, at least 3 Si—H per molecule, | | | | |
| 20-50 mPas, chain length 20-30 | 0.7 | 0.77 | | 0.54 |
| 20-70 mPas, chain length 45-60 | 1.0 | 1.15 | | 1.15 |
| (E) Pt-catalyst (platinum-divinyltetramethyl-disiloxane complex) | 15 ppm Pt | | | — |
| (F) Hydrophobicized HDK (BET 300 m$^2$/g) | 23.4 | | | — |
| (G) Divinyltetramethyldisiloxane | 0.04 | | 0.01075 | 0.004 |
| (H) α-Methacryloyloxymethyltri-ethoxysilane | 2 | | | — |
| Total | | | SiH/SiVi | 6.1 |

Production of the Compositions Set Out in Tables 1-7:

Preparation took place using preliminary mixtures of vinyl-containing siloxane (A) and hydrophobicized silica (F). Using a laboratory mixer, the other constituents were added to produce a homogeneous mixture, the Pt catalyst (E) not being mixed in, in the case of the 2-component mixtures, until directly prior to application, in the form of a premix with vinyl polymer (A). The mixtures specified in tables 1-7 represent the respective compositions of the mixtures applied to the substrate.

Processing

The mixtures are applied using a spatula to precleaned and to dry substrates (plaque form 2.5×5 cm) at room temperature, initially giving a layer thickness of 0.5-1 cm. The substrates are precleaned by washing with isopropanol, followed by drying.

2-Component Room-Temperature-Crosslinking Systems

The coated substrates are immediately covered with a corresponding further substrate over an area of 2.5×1 cm (resulting layer thickness about 0.5 mm). After about 30 minutes, the determination of the fracture mode after loading is commenced. For this purpose, every 10 minutes, on each one of the samples prepared as described above (6-8 samples per composition), the two protruding ends of the substrates are loaded manually in a peeling motion up to the point of a right angle relative to one another, and then the fracture behavior is investigated.

UV-Active Room-Temperature-Crosslinking Systems 6-8 substrates are coated as described above and irradiated with UV light (Fe lamp 250-350 nm) having an intensity of 140 mW/cm$^2$ for 10 seconds at room temperature. Following this irradiation, the substrates are immediately joined to the corresponding counter-plaques, producing a silicone layer thickness of approximately 0.5 mm. About 10 minutes after the irradiation, the manual peel loading of the substrates for the purpose of assessing the fracture behavior is commenced.

In tables 8 and 9, the meaning of the abbreviations is as follows:

A− adhesive fracture
C+ cohesive fracture

Table 8 reports the results of the adhesion tests on PBT (polybutylene terephthalate).

TABLE 8

| Formulation | 1a) | 1b) | 1c) | 1d) | 2a) | 2b) | 2c) |
|---|---|---|---|---|---|---|---|
| Inventive Fracture mode | + | − | + | − | + | − | + |
| 5 min | | | | | | | |
| 10 min | | | A− | | C+ | | |
| 20 min | | A− | C+ | | C+ | A− | |
| 30 min | A− | A− | C+ | A− | C+ | A− | A− |
| 40 min | A− | A− | C+ | A− | C+ | A− | A− |
| 50 min | A− | | C+ | A− | C+ | | C+ |
| 60 min | C+ | A− | | A− | | A− | C+ |
| 2 h | C+ | A− | C+ | A− | C+ | A− | C+ |
| 6 h | C+ | A− | C+ | A− | C+ | A− | C+ |
| 1 d | C+ | C+ | C+ | A− | C+ | A− | C+ |
| 2 d | C+ | C+ | C+ | A− | C+ | A− | C+ |

Table 9 reports the results of the adhesion tests on PA (polyamide).

TABLE 9

| Formulation | 1a) | 1b) | 1c) | 1d) | 2a) | 2b) | 2c) |
|---|---|---|---|---|---|---|---|
| Inventive Fracture mode | + | − | + | − | + | − | + |
| 5 min | | | | | | | |
| 10 min | | | A− | | A− | A− | |
| 20 min | | A− | A− | | A− | A− | |
| 30 min | A− | A− | A− | A− | A− | A− | A− |
| 40 min | A− | A− | A− | A− | C+ | A− | A− |
| 50 min | A− | | C+ | A− | C+ | A− | C+ |
| 60 min | C+ | A− | C+ | A− | C+ | A− | C+ |
| 2 h | C+ | A− | C+ | A− | C+ | A− | C+ |
| 6 h | C+ | C+ | C+ | A− | C+ | A− | |
| 1 d | C+ | C+ | | A− | | | C+ |
| 2 d | C+ | C+ | C+ | A− | C+ | A− | C+ |

From Tables 8 and 9 it is clearly apparent that only the inventive compositions 1a), 1c), 2a) and 2c) achieve a cohesive fracture mode and hence appropriately firm bonding to the substrate after no later than 60 minutes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A self-adhesive addition-crosslinking silicone composition comprising
    (i) at least one compound selected from the group consisting of the compounds (A), and (K),
    where
    (A) is an organosilicon compound comprising at least two radicals having aliphatic carbon-carbon multiple bonds, and
    (K) is an organosilicon compound comprising SiC-bonded radicals having aliphatic carbon-carbon multiple bonds and Si-bonded hydrogen atoms,
    the composition further comprising (C), a linear, SiH-terminated organopolysiloxane
        with the proviso that the composition comprises 1-50 parts of at least one organopolysiloxane compound (C) and optionally 0-30 parts of organosilicon compounds having at least three Si-bonded hydrogen atoms, based on 100 parts (A),
    (ii) at least one UV activatable platinum catalyst (E) which is activated by irradiation with light of 250-500 nm wavelength in catalytic amount, and
    (iii) at least one α-silane (H) which is methacryloyloxymethyltriethoxysilane.

2. The addition-crosslinking silicone composition of claim 1, further comprising:
    (iv) at least one mechanically reinforcing filler (F).

3. The addition-crosslinking silicone composition of claim 1, further comprising:
    (v) at least one compound (G) selected from the group containing inert fillers, resinlike polyorganosiloxanes other than the siloxanes (A), (C), and (K), silanes other than (H), inhibitors, stabilizers, reinforcing and nonreinforcing fillers, fungicides, fragrances, rheological additives, corrosion inhibitors, antioxidants, light stabilizers, flame retardants, agents for influencing the electrical properties, dispersing assistants, solvents, adhesion promoters, pigments, dyes, plasticizers, organic polymers, heat stabilizers, or mixtures thereof.

4. The addition-crosslinking silicone composition of claim 2, further comprising:
    (v) at least one compound (G) selected from the group containing inert fillers, resinlike polyorganosiloxanes other than the siloxanes (A), (C), and (K), silanes other than (H), inhibitors, stabilizers, reinforcing and nonreinforcing fillers, fungicides, fragrances, rheological additives, corrosion inhibitors, antioxidants, light stabilizers, flame retardants, agents for influencing the electrical properties, dispersing assistants, solvents, adhesion promoters, pigments, dyes, plasticizers, organic polymers, heat stabilizers, or mixtures thereof.

5. The addition-crosslinking silicone composition of claim 1, wherein the platinum catalyst (E) is activated by UV light and has no catalytic activity at room temperature absent UV irradiation.

6. The addition-crosslinking silicone composition of claim 3, wherein following irradiation with ultraviolet light, the composition cures within 20 minutes.

7. A process for the preparation of the addition-crosslinking silicone composition of claim 1, comprising uniformly mixing all of the components.

8. An adhesive, encapsulant or sealing material, comprising the addition-crosslinking silicone composition of claim 1 which has been cured by irradiation with ultraviolet light.

9. A self-adhesive addition-crosslinking silicone composition comprising
    (i) at least one compound selected from the group consisting of the compounds (A), and (K),
    where
    (A) is an organosilicon compound comprising at least two radicals having aliphatic carbon-carbon multiple bonds, and
    (K) is an organosilicon compound comprising SiC-bonded radicals having aliphatic carbon-carbon multiple bonds and Si-bonded hydrogen atoms,
    the composition further comprising (C), a linear, SiH-terminated organopolysiloxane
        with the proviso that the composition comprises 1-50 parts of at least one organopolysiloxane compound (C) and optionally 0-30 parts of organosilicon compounds having at least three Si-bonded hydrogen atoms, based on 100 parts (A),
    (ii) at least one UV activatable platinum catalyst (E) which is activated by irradiation with light of 250-500 nm wavelength in catalytic amount, and
    (iii) at least one adhesion promoter selected from the group consisting of trialkoxy-functional silanes, with the proviso that at least one trialkoxy-functional silane is -methacryloyloxytriethoxysilane.

10. The composition of claim 1, wherein the ratio of silicon bonded hydrogen to silicon bonded aliphatic carbon-carbon multiple bonds is from 0.5:1 to 10:1.

11. The composition of claim 9, wherein the ratio of silicon bonded hydrogen to silicon bonded aliphatic carbon-carbon multiple bonds is from 0.5:1 to 10:1.

* * * * *